US009712056B1

(12) United States Patent
Shearer et al.

(10) Patent No.: US 9,712,056 B1
(45) Date of Patent: Jul. 18, 2017

(54) THREE-PHASE POWER SWITCHING FOR UNGROUNDED WYE CIRCUITS

(71) Applicant: Goodrich Corporation, Charlotte, NC (US)

(72) Inventors: Jon Shearer, Hartville, OH (US); Carl Aeschliman, Wadsworth, OH (US); Sabeshan Sean Periyathamby, Copley, OH (US)

(73) Assignee: Goodrich Corporation, Charlotte, NC (US)

( * ) Notice: Subject to any disclaimer, the term of this patent is extended or adjusted under 35 U.S.C. 154(b) by 4 days.

(21) Appl. No.: 15/000,608

(22) Filed: Jan. 19, 2016

(51) Int. Cl.
*G05F 5/00* (2006.01)
*H02M 3/158* (2006.01)
*H02M 1/44* (2007.01)

(52) U.S. Cl.
CPC ............. *H02M 3/158* (2013.01); *H02M 1/44* (2013.01)

(58) Field of Classification Search
CPC ......................................................... G05F 5/00
USPC .................................................. 323/299, 300
See application file for complete search history.

(56) References Cited

U.S. PATENT DOCUMENTS

| | | | |
|---|---|---|---|
| 3,742,370 A | 6/1973 | Hansen | |
| 3,946,304 A * | 3/1976 | Thorsoe | G05F 1/445 323/300 |
| 4,459,528 A * | 7/1984 | Nola | H02P 23/26 318/729 |
| 4,701,645 A | 10/1987 | Ferguson | |
| 5,321,600 A | 6/1994 | Fierheller | |
| 7,196,435 B2 | 3/2007 | Kugelman et al. | |
| 7,378,821 B2 * | 5/2008 | Simpson, III | H02J 3/1892 323/205 |
| 7,402,990 B2 | 7/2008 | Xu | |
| 7,898,104 B1 | 3/2011 | Verges | |
| 8,482,942 B2 | 7/2013 | Choi | |
| 2004/0245961 A1 | 12/2004 | Ueda et al. | |

* cited by examiner

*Primary Examiner* — Jeffrey Sterrett
(74) *Attorney, Agent, or Firm* — Kinney & Lange, P.A.

(57) ABSTRACT

A power control system includes a multi-phase power source, an ungrounded multi-phase load, a plurality of power switching circuits and a plurality of zero-crossing circuits. The multi-phase power source includes a plurality of phase power outputs. The plurality of power switching circuits are each connected to provide power from one of the plurality of phase power outputs to the ungrounded multi-phase load. The plurality of zero-crossing circuits are connected to provide control signals to the plurality of power switching circuits. Each of the plurality of zero-crossing circuits are connected between one of the plurality of power phase outputs and an ungrounded reference.

20 Claims, 4 Drawing Sheets

THREE-PHASE POWER SWITCHING FOR UNGROUNDED WYE CIRCUITS

BACKGROUND

The present invention relates generally to power transfer systems, and in particular to a system and method for reducing electromagnetic interference (EMI) in alternating current (AC) power switching systems.

Three-phase power systems, such as those implemented on aircraft, often include three-phase loads connected in a wye configuration. Some aircraft manufacturers will not allow the grounding of the neutral point of these three-phase AC power loads. Because of this, the load often includes the neutral point of the wye circuit that is floating, instead of grounded. Floating neutrals are difficult to control, leading to increased chance for generated EMI during switching of the AC power to the load. To solve this problem in prior art systems, heavy inductors and large capacitors have been utilized to reduce the level of EMI. This adds unwanted weight and cost to the system. It is desirable to provide accurate zero-crossing power switching for ungrounded loads in three-phase systems in order to reduce the amount of generated EMI.

SUMMARY

A power control system includes a multi-phase power source, an ungrounded multi-phase load, a plurality of power switching circuits and a plurality of zero-crossing circuits. The multi-phase power source includes a plurality of phase power outputs. The plurality of power switching circuits are each connected to provide power from one of the plurality of phase power outputs to the ungrounded multi-phase load. The plurality of zero-crossing circuits are connected to provide control signals to the plurality of power switching circuits. Each of the plurality of zero-crossing circuits are connected between one of the plurality of power phase outputs and an ungrounded reference.

A method of controlling power from a multi-phase power source to an ungrounded multiphase load, the method includes providing the power from the multi-phase power source to a plurality of power switching circuits; controlling, using the plurality of power switching circuits, the power provided to the ungrounded multiphase load, wherein the plurality of power switching circuits are configured to command power on and off at zero-crossings of the power; and providing, by a plurality of zero-crossing circuits, control signals to the plurality of power switching circuits, wherein each of the plurality of zero-crossing circuits are connected between one of the plurality of power phase outputs and an ungrounded reference.

DETAILED DESCRIPTION

A power transfer system is disclosed herein that transfers multi-phase alternating current (AC) power for ungrounded wye circuits. The system includes a three-phase AC power source configured to provide power to a three-phase ungrounded load. Each phase power line from the power source includes a power switching circuit configured to control power from the power phase to the load phase. For each power switching circuit, a corresponding zero-crossing circuit is implemented to provide control signals to the power switching circuit.

Each zero-crossing circuit is connected between the respective power phase line and an ungrounded reference. In one embodiment, the ungrounded reference is another one of the power phase lines. In another embodiment, the ungrounded reference is a neutral point of a load reference circuit. The load reference circuit is connected in parallel with the three-phase load circuit and includes three resistors of equivalent resistance. The zero-crossing circuits are configured to provide a first control signal to the respective power switching circuit to indicate that the voltage on the respective power line is in a positive half cycle, and a second control signal to indicate that the voltage on the respective power line is in a negative half cycle. The respective power switching circuit utilizes these signals to enable power to flow to the respective load signal at a zero-crossing of the voltage on the respective power line in order to reduce electromagnetic interference (EMI) in the system.

Figure 1A:
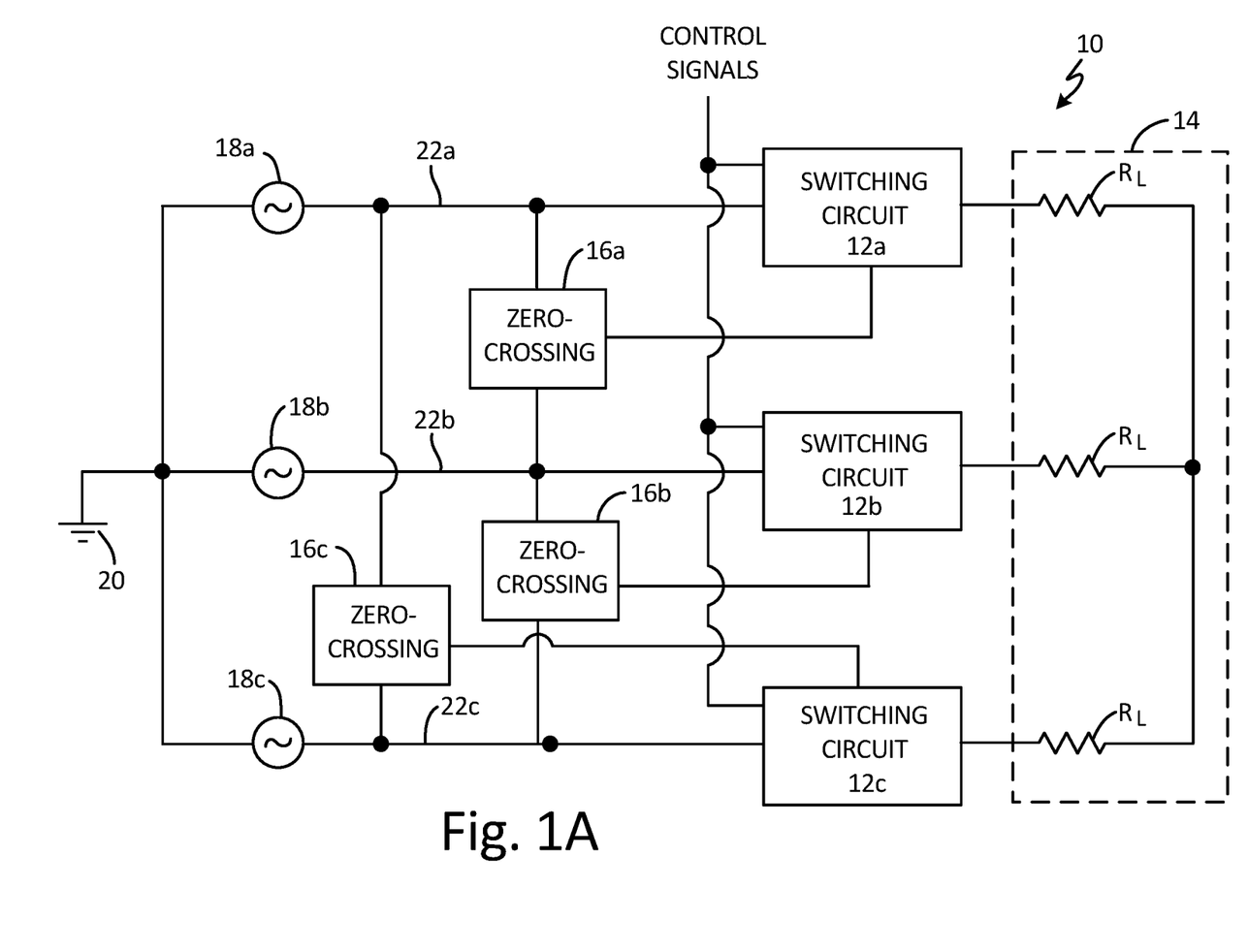
FIGS. 1A and 1B are block diagrams illustrating three-phase power switching systems for ungrounded wye circuits.

FIG. 1A is block diagram illustrating three-phase power switching system 10. System 10 includes switching circuits 12a-12c, load circuit 14, zero-crossing circuits 16a-16c, a three-phase AC power source that includes power phases 18a-18c, and ground 20. Although illustrated as a three-phase system in FIG. 1A, system 10 may be a multi-phase system including any number of AC phases. Three-phase AC power source phases 18a-18c may produce, for example, 115 volt power at 400 Hz on power phase lines 22a-22c. System 10 may be implemented on an aircraft, for example. The neutral point of the three-phase AC power source may be connected to ground 20 which may be, for example, the chassis of the aircraft.

Load circuit 14 may be implemented as an ungrounded wye circuit, for example. As illustrated in FIG. 1A, load circuit 14 includes three-phase load resistors ($R_L$) connected in an ungrounded wye configuration. Load resistors (RL) represent any three-phase phase load such as an aircraft air heater, for example. Some aircraft manufacturers do not want load circuit 14 tied to ground 20 and thus, the neutral point of load circuit 14 remains floating.

When enabling/disabling power to a load, the switching action can generate undesirable EMI. This EMI may be minimized if the power switches are operated (i.e., opened or closed) at the zero-crossings of voltage from the AC power source 18a-18c for each respective power phase line 22a-22c. In prior art power switching systems, the system relied upon the neutral point of load circuit 14 being tied to ground 20 in order to ensure switching at the zero-crossings of phases 18a-18c. The voltage of each power phase line 22a-22c would be compared to the grounded neutral point of load 14 to generate control signals for switching circuits 12a-12c. However, this method may produce unpredictable results in systems in which load 14 is ungrounded (e.g., the neutral point is not tied to the chassis of the aircraft).

In the embodiment illustrated in FIG. 1A, zero-crossing circuits 16a-16c are each connected between two of the power phase lines 22a-22c. Zero-crossing circuit 16a may be connected between lines 22a and 22b, zero-crossing circuit 16b may be connected between lines 22b and 22c, and zero-crossing circuit 16c may be connected between lines 22a and 22c. Zero-crossing circuit 16a is coupled to provide control signals to switching circuit 12a, zero-crossing circuit 16b is coupled to provide control signals to switching circuit 12b, and zero-crossing circuit 16c is coupled to provide control signals to switching circuit 12c. Switching circuits 12a-12c also may receive control signals, for example, from an internal or external microcontroller (not shown).

Switching circuits 12a-12c are configured to control provision of power to load circuit 14 from power lines 22a-22c. Switching circuits 12a-12c may be implemented using, for example, power metal-oxide-semiconductor field-effect transistors (MOSFETs). Switching circuits 12a-12c may be configured to utilize the signals from zero-crossing circuits 16a-16c in addition to the control signals in order to control power to load 14 at the zero-crossings of each phase 18a-18c. By switching power on and off to load 14 at the zero-crossings of power source phases 18a-18c, EMI may be minimized.

Zero-crossing circuits 16a-16c may be configured to provide signals to switching circuits 12a-12c that allow the respective switching circuit 12a-12c to switch power to load 14 at zero-crossings of respective power phases 18a-18c. For example, zero-crossing circuits 16a-16c may each provide signals to respective switching circuits 12a-12c indicative of, for example, positive half cycles and negative half cycles of voltage on respective power line 22a-22c. In the embodiment illustrated in FIG. 1A, phase line 22b lags phase line 22a by 120° and phase line 22c lags phase line 22b by 120°. This way, each zero-crossing circuit 16a-16c compares a first voltage that is 120° ahead of a second voltage. Because of this, zero-crossing circuits 16a-16c are each able to provide control signals that are indicative of positive half-cycles and negative half-cycles of voltage on the respective power phase lines 22a-22c.

Figure 1B:
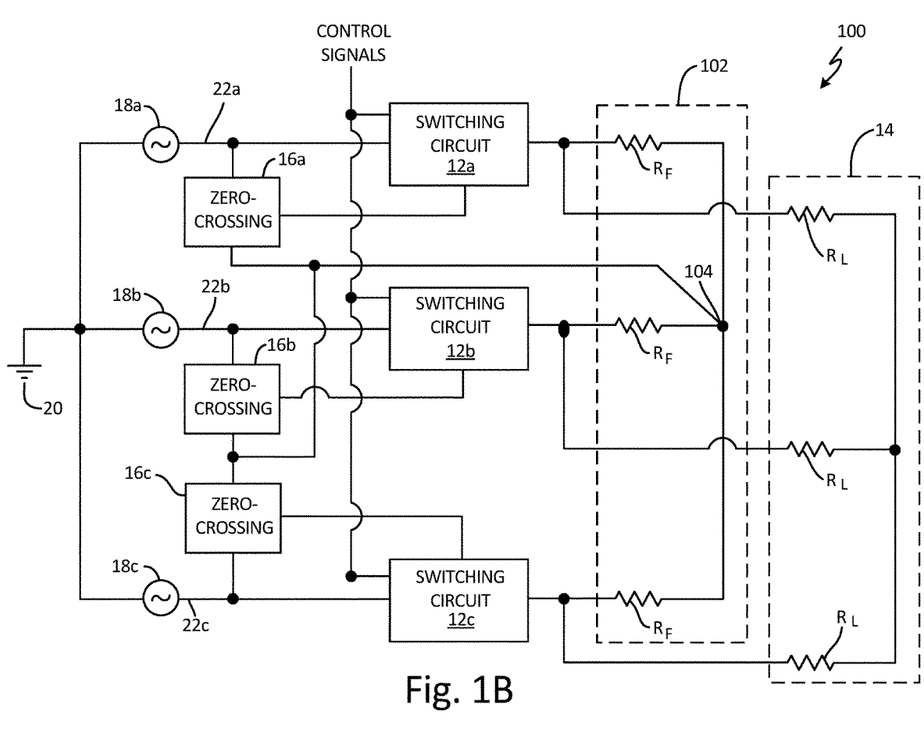

FIG. 1B is block diagram that illustrates three-phase power switching system 100. System 100 includes switching circuits 12a-12c, load circuit 14, zero-crossing circuits 16a-16c, a three-phase AC power source that includes power phases 18a-18c, ground 20, and virtual ground circuit 102. Although illustrated as a three-phase system in FIG. 1B, system 100 may be a multi-phase system including any number of AC phases. Three-phase AC power source phases 18a-18c may produce, for example, 115 volt power at 400 Hz on power phase lines 22a-22c. System 100 may be implemented on an aircraft, for example. The neutral point of three-phase AC power source 18a-18c may be connected to ground 20 which may be, for example, the chassis of the aircraft. Components may operate in a substantially similar manner as those with the same reference number in the embodiment illustrated in FIG. 1A.

Virtual ground circuit 102 includes three resistors ($R_F$) and a common node 104. Node 104 provides a floating virtual ground reference for zero-crossing circuits 16a-16c. Resistors $R_F$ may all have the same resistance in order to facilitate a reliable reference at node 104. This value may be, for example, 20 kΩ The resistance of each resistor $R_F$ may be selected to ensure that enough current is generated to operate zero-crossing circuits 16a-16c. For example, if zero-crossing circuits 16a-16c utilize opto-couplers, resistors $R_F$ may be sized to ensure at least 2-3 mA of current through each respective zero-crossing circuit 16a-16c. If using 20 kΩ resistors RF, approximately 5 mA of current may be provided to zero-crossing circuits 16a-16c.

By using the virtual ground circuit 102, zero-crossing circuits 16a-16c will operate to control switching circuits 12a-12c in a similar manner to the embodiment illustrated in FIG. 1A, but without the need of knowing the phase order of phase lines 22a-22c, allowing system 100 to be phase independent. For example, when all switching circuits 12a are commanding power off to load 14, no current flows in virtual ground circuit 102, and thus voltage at node 104 is approximately zero. Thus, when the control signals to switching circuit 12a-12c from a controller, for example, indicate to command power on to load 14, whichever phase 18a-18c is the leading phase, will have its respective switching circuit turn on to enable power flow first.

Following enablement of power flow for the leading power phase 18a-18c, the voltage of node 104 will follow the first phase. Thus, the second phase 18a-18c will have its zero-crossing circuit command its respective switching circuit 12a-12c to enable power flow to load 14. The voltage of node 104 will then follow the combination of the first two phases 18a-18c. The third phase 18a-18c will then have its respective zero-crossing circuit 16a-16c command its respective switching circuit 12a-12c on based upon the comparison of the third respective phase 18a-18c and the voltage of node 104. The voltage of node 104 follows the combination of the first two phase voltages, which will be 180° out of phase with the third respective power phase 18a-18c. In this way, the order of phases 18a-18c is irrelevant for proper operation of zero-crossing circuits 16a-16c, which may be beneficial in systems that do not have a specified phase order for power phases 18a-18c.

Figure 2:
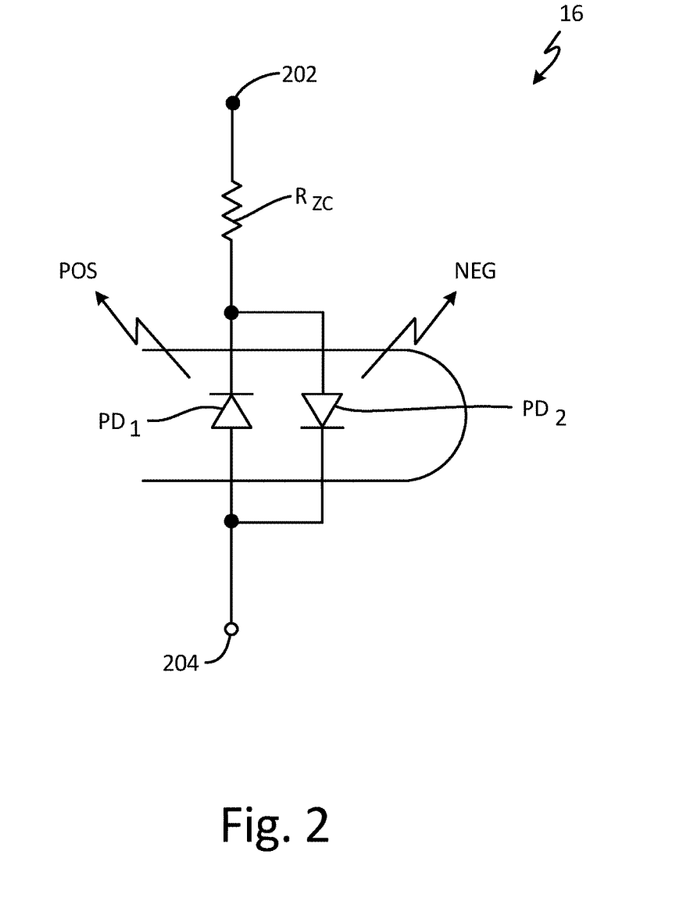
FIG. 2 is a circuit diagram illustrating a zero-crossing detection circuit of a three-phase power switching system.

FIG. 2 is a circuit diagram that illustrates an embodiment of zero-crossing circuit 16. The embodiment of zero-crossing circuit 16 illustrated in FIG. 2 may be utilized to implement the zero-crossing circuits 16a-16c of the embodiments illustrated in FIGS. 1A and 1B. Zero-crossing circuit 16 includes voltage reference nodes 202 and 204, resistor $R_{ZC}$ and an optocoupler that includes photodiodes $PD_1$ and $PD_2$. $R_{ZC}$ may be sized to draw a desired current for operation of photodiodes $PD_1$ and $PD_2$.

Reference node 202 may be tied to one of the power phase lines 22a-22c, while reference node 204 may be tied to an ungrounded reference. In the embodiment illustrated in FIG. 1A, the ungrounded reference may be another one of power phase lines 22a-22c, while in the embodiment illustrated in FIG. 1B, the ungrounded reference may be node 104 of virtual ground circuit 102. For example, in the embodiment illustrated in FIG. 1A, the voltage on node 204 may lag the voltage on node 202 by 120°.

When the voltage on reference node 204 is great enough relative to the voltage on reference node 202, photodiode $PD_1$ is forward biased, and an optical signal (POS) is generated for use by a respective power switching circuit 12a-12c. When the voltage on reference node 202 is great enough relative to the voltage on reference node 204, photodiode $PD_2$ is forward biased, and an optical signal (NEG) is generated for used by respective power switching circuit 12a-12c. While illustrated as an optocoupler with photodiodes $PD_1$ and $PD_2$, any other electronic device capable of providing signals based upon a comparison of voltages on nodes 202 and 204 may be utilized.

Figure 3:
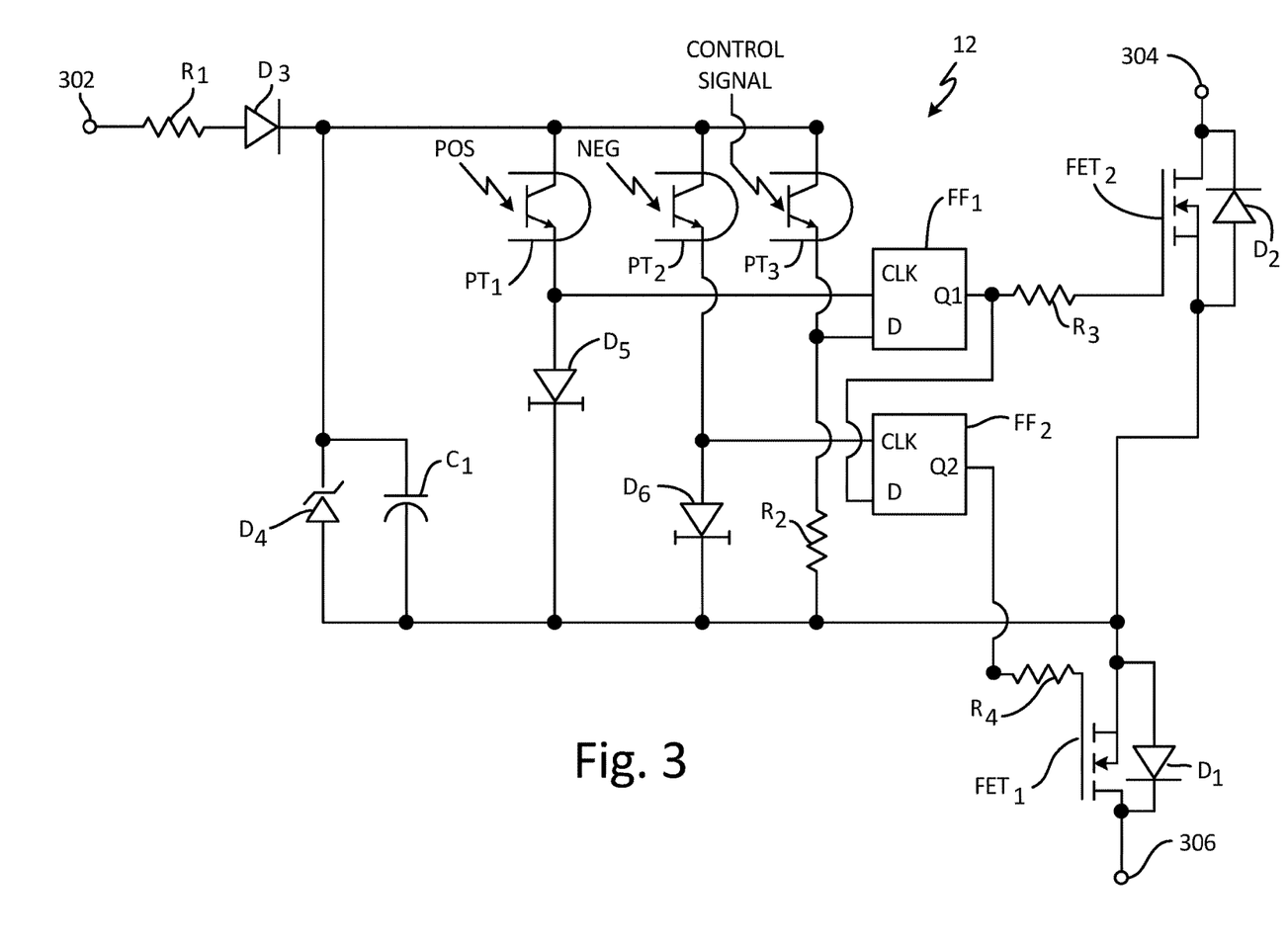
FIG. 3 is a circuit diagram illustrating a switching circuit of a three-phase power switching system.

With continued reference to FIGS. 1-2, FIG. 3 is a circuit diagram illustrating a power switching circuit 12 of a three-phase power switching system. Power switching circuit 12 may be utilized to implement all of power switching circuits 12a-12c of the embodiments illustrated in FIGS. 1A and 1B. Power switching circuit 12 includes reference nodes 302, 304 and 306, power switches $FET_1$ and $FET_2$, diodes $D_1$-$D_6$, Resistors $R_1$-$R_4$, photo-transistors $PT_1$-$PT_3$ and flip-flops $FF_1$ and $FF_2$. Node 302 may be connected, for example, to the power supply. Node 304 may be connected to the respective load $R_L$, and node 306 may be connected to the respective phase power line 22a-22c.

When power is to be enabled to a respective load $R_L$, a control signal is provided to photo-transistor $PT_3$ from, for example, a controller (not shown). Although illustrated as a photo-transistor, any other device capable of receiving a signal to enable a current flow may be utilized in place of photo-transistor $PT_3$. Upon receiving the signal, current flows through $PT_3$ and resistor $R_2$ which generates a voltage equivalent to a logic "1" that is provided as input to $FF_1$. The input from $PT_3$ is stored in $FF_1$ upon $PT_1$ providing a signal to the clock input of $FF_1$. This occurs when $PT_1$ receives the "POS" signal from the respective zero-crossing circuit 16. This way, $FF_1$ provides an output to turn on $FET_2$ following receipt of the POS signal from zero-crossing circuit 16.

Due to the configuration of zero-crossing circuit 16, the voltage from the respective phase power line 22a-22c (i.e., the voltage at node 306) is in a positive half cycle when the POS signal is received at $PT_1$. With $FET_2$ turned off and $FET_1$ turned on, power will not flow from node 306 to node 304 when the voltage at node 306 is positive. Thus, when the voltage on node 306 transitions to negative (i.e., at the zero-crossing from positive to negative), power will flow from node 304 to node 306 through $FET_2$ and diode $D_1$ for the negative half-cycle of power on respective phase power line 22a-22c.

The output of $FF_1$ is also provided to $FF_2$. This way, when the NEG signal is received from zero-crossing circuit 16, indicating that the voltage on node 306 is in a negative half cycle, $FF_2$ stores the logic "1" from $FF_1$, which turns on $FET_1$. Because $FET_1$ is now turned on, power will flow from node 306 to node 304 for the next positive half cycle. Now that both $FET_1$ and $FET_2$ are turned on, power flows normally for both half cycles from respective power line 22a-22c to respective load $R_L$. By utilizing zero-crossing circuit 16 and power switching circuit 12, it is ensured that power is turned on to ungrounded load 14 only at zero-crossings of the power on respective power lines 22a-22c, regardless of when the control signal is received from the external controller. This reduces EMI, which is crucial in sensitive electronic environments, such as those on aircraft.

Discussion of Possible Embodiments

The following are non-exclusive descriptions of possible embodiments of the present invention.

A power control system includes a multi-phase power source, an ungrounded multi-phase load, a plurality of power switching circuits and a plurality of zero-crossing circuits. The multi-phase power source includes a plurality of phase power outputs. The plurality of power switching circuits are each connected to provide power from one of the plurality of phase power outputs to the ungrounded multi-phase load. The plurality of zero-crossing circuits are connected to provide control signals to the plurality of power switching circuits. Each of the plurality of zero-crossing circuits are connected between one of the plurality of power phase outputs and an ungrounded reference.

The power control system of the preceding paragraph can optionally include, additionally and/or alternatively, any one or more of the following features, configurations, operations, and/or additional components:

A further embodiment of the foregoing power control system, wherein the multiphase power source is a three-phase power source having first, second and third power phase outputs, and wherein the multi-phase load is a three-phase load having first second and third load phases.

A further embodiment of any of the foregoing power control systems, wherein the plurality of power switching circuits includes a first power switching circuit connected between the first power phase output and the first load phase, a second power switching circuit connected between the second power phase output and the second load phase, and a third power switching circuit connected between the third power phase output and the third load phase.

A further embodiment of any of the foregoing power control systems, wherein the plurality of zero-crossing circuits includes a first zero-crossing circuit connected between the first power phase output and the second power phase output and configured to provide first control signals to the first power switching circuit, a second zero-crossing circuit connected between the second power phase output and the third power phase output and configured to provide second control signals to the second power switching circuit, and a third zero-crossing circuit connected between the first power phase output and the third power phase output and configured to provide third control signals to the third power switching circuit.

A further embodiment of any of the foregoing power control systems, further including a virtual load reference circuit connected in parallel with the ungrounded multi-phase load, wherein each of the plurality of zero-crossing circuits is connected between the one of the plurality of power phase outputs and the virtual load reference circuit.

A further embodiment of any of the foregoing power control systems, wherein the multiphase power source is a three-phase power source having first, second and third power phase outputs, and wherein the multi-phase load is a three-phase load having first second and third load phases.

A further embodiment of any of the foregoing power control systems, wherein the plurality of power switching circuits includes a first power switching circuit connected between the first power phase output and the first load phase, a second power switching circuit connected between the second power phase output and the second load phase, and a third power switching circuit connected between the third power phase output and the third load phase.

A further embodiment of any of the foregoing power control systems, wherein the virtual load reference circuit includes an ungrounded reference node, a first resistor connected between the first power switching circuit and the ungrounded reference node, a second resistor connected between the second power switching circuit and the ungrounded reference node, and a third resistor connected between the third power switching circuit and the ungrounded reference node.

A further embodiment of any of the foregoing power control systems, wherein the first, second and third resistors all have a common resistance value.

A further embodiment of any of the foregoing power control systems, wherein the plurality of zero-crossing circuits includes a first zero-crossing circuit connected between the first power phase output and the ungrounded reference node, a second zero-crossing circuit connected between the second power phase output and the ungrounded reference node, and a third zero-crossing circuit connected between the third power phase output and the ungrounded reference node.

A method of controlling power from a multi-phase power source to an ungrounded multiphase load, the method includes providing the power from the multi-phase power source to a plurality of power switching circuits; controlling, using the plurality of power switching circuits, the power provided to the ungrounded multiphase load, wherein the plurality of power switching circuits are configured to command power on and off at zero-crossings of the power; and providing, by a plurality of zero-crossing circuits, control signals to the plurality of power switching circuits, wherein each of the plurality of zero-crossing circuits are connected between one of the plurality of power phase outputs and an ungrounded reference.

The power method of the preceding paragraph can optionally include, additionally and/or alternatively, any one or more of the following features, configurations, operations, and/or additional components:

A further embodiment of the foregoing method, wherein the multiphase power source is a three-phase power source having first, second and third power phase outputs, and wherein the multi-phase load is a three-phase load having first second and third load phases.

A further embodiment of any of the foregoing methods, wherein controlling, using the plurality of power switching circuits, the power provided to the ungrounded multiphase load includes controlling, using a first power switching circuit, power from the first power phase output to the first load phase; controlling, using a second power switching circuit, power from the second power phase output to the second load phase; and controlling, using a third power switching circuit, power from the third power phase output to the third load phase.

A further embodiment of any of the foregoing methods, wherein providing, by the plurality of zero-crossing circuits, control signals to the plurality of power switching circuits includes connecting a first zero-crossing circuit between the first power phase output and the second power phase output; and configured to provide first control signals to the first power switching circuit; providing first control signals from the first zero-crossing circuit to the first power switching circuit; connecting a second zero-crossing circuit between the second power phase output and the third power phase output; providing second control signals from the second zero-crossing circuit to the second power switching circuit; connecting a third zero-crossing circuit between the first power phase output and the third power phase output; and providing third control signals from the third zero-crossing circuit to the third power switching circuit.

A further embodiment of any of the foregoing methods, further including providing, by a virtual load reference circuit connected in parallel with the ungrounded multi-phase load, the ungrounded reference for the plurality of zero-crossing circuits.

A further embodiment of any of the foregoing methods, wherein the multiphase power source is a three-phase power source having first, second and third power phase outputs, and wherein the multi-phase load is a three-phase load having first second and third load phases.

A further embodiment of any of the foregoing methods, wherein controlling, using the plurality of power switching circuits, the power provided to the ungrounded multiphase load includes controlling, using a first power switching circuit, power from the first power phase output to the first load phase; controlling, using a second power switching circuit, power from the second power phase output to the second load phase; and controlling, using a third power switching circuit, power from the third power phase output to the third load phase.

A further embodiment of any of the foregoing methods, wherein providing, by the virtual load reference circuit connected in parallel with the ungrounded multi-phase load, the ungrounded reference includes connecting a first resistor between the first power switching circuit and an ungrounded reference node; connecting a second resistor between the second power switching circuit and the ungrounded reference node; and connecting a third resistor between the third power switching circuit and the ungrounded reference node.

A further embodiment of any of the foregoing methods, wherein the first, second and third resistors all have a common resistance value.

A further embodiment of any of the foregoing methods, wherein providing, by the plurality of zero-crossing circuits, the control signals to the plurality of power switching circuits includes connecting a first zero-crossing circuit between the first power phase output and the ungrounded reference node; connecting a second zero-crossing circuit between the second power phase output and the ungrounded reference node; and connecting a third zero-crossing circuit between the third power phase output and the ungrounded reference node.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A power control system comprising:
   a multi-phase power source that includes a plurality of phase power outputs;
   an ungrounded multi-phase load;
   a plurality of power switching circuits each connected to provide power from one of the plurality of phase power outputs to the ungrounded multiphase load; and
   a plurality of zero-crossing circuits connected to provide control signals to the plurality of power switching circuits, wherein each of the plurality of zero-crossing circuits are connected between one of the plurality of power phase outputs and an ungrounded reference.

2. The power control system of claim 1, wherein the multiphase power source is a three-phase power source having first, second and third power phase outputs, and wherein the multi-phase load is a three-phase load having first second and third load phases.

3. The power control system of claim 2, wherein the plurality of power switching circuits comprises:
   a first power switching circuit connected between the first power phase output and the first load phase;
   a second power switching circuit connected between the second power phase output and the second load phase; and
   a third power switching circuit connected between the third power phase output and the third load phase.

4. The power control system of claim 3, wherein the plurality of zero-crossing circuits comprises:
   a first zero-crossing circuit connected between the first power phase output and the ungrounded reference and configured to provide first control signals to the first power switching circuit;
   a second zero-crossing circuit connected between the second power phase output and the ungrounded reference and configured to provide second control signals to the second power switching circuit; and a third zero-crossing circuit connected between the first power phase output and the ungrounded reference and configured to provide third control signals to the third power switching circuit.

5. The power control system of claim 1, further comprising:
a virtual load reference circuit connected in parallel with the ungrounded multi-phase load, wherein each of the plurality of zero-crossing circuits is connected between the one of the plurality of power phase outputs and the virtual load reference circuit.

6. The power control system of claim 5, wherein the multiphase power source is a three-phase power source having first, second and third power phase outputs, and wherein the multi-phase load is a three-phase load having first second and third load phases.

7. The power control system of claim 6, wherein the plurality of power switching circuits comprises:
a first power switching circuit connected between the first power phase output and the first load phase;
a second power switching circuit connected between the second power phase output and the second load phase; and
a third power switching circuit connected between the third power phase output and the third load phase.

8. The power control system of claim 7, wherein the virtual load reference circuit comprises:
an ungrounded reference node;
a first resistor connected between the first power switching circuit and the ungrounded reference node;
a second resistor connected between the second power switching circuit and the ungrounded reference node; and
a third resistor connected between the third power switching circuit and the ungrounded reference node.

9. The power control system of claim 8, wherein the first, second and third resistors all have a common resistance value.

10. The power control system of claim 8, wherein the plurality of zero-crossing circuits comprises:
a first zero-crossing circuit connected between the first power phase output and the ungrounded reference node;
a second zero-crossing circuit connected between the second power phase output and the ungrounded reference node; and
a third zero-crossing circuit connected between the third power phase output and the ungrounded reference node.

11. A method of controlling power from a multi-phase power source to an ungrounded multiphase load, the method comprising:
providing the power from the multi-phase power source to a plurality of power switching circuits;
controlling, using the plurality of power switching circuits, the power provided to the ungrounded multiphase load, wherein the plurality of power switching circuits are configured to command power on and off at zero-crossings of the power; and
providing, by a plurality of zero-crossing circuits, control signals to the plurality of power switching circuits, wherein each of the plurality of zero-crossing circuits are connected between one of the plurality of power phase outputs and an ungrounded reference.

12. The method of claim 11, wherein the multiphase power source is a three-phase power source having first, second and third power phase outputs, and wherein the multi-phase load is a three-phase load having first second and third load phases.

13. The method of claim 12, wherein controlling, using the plurality of power switching circuits, the power provided to the ungrounded multiphase load comprises:
controlling, using a first power switching circuit, power from the first power phase output to the first load phase;
controlling, using a second power switching circuit, power from the second power phase output to the second load phase; and
controlling, using a third power switching circuit, power from the third power phase output to the third load phase.

14. The method of claim 13, wherein providing, by the plurality of zero-crossing circuits, control signals to the plurality of power switching circuits comprises:
connecting a first zero-crossing circuit between the first power phase output and the ungrounded reference; and configured to provide first control signals to the first power switching circuit;
providing first control signals from the first zero-crossing circuit to the first power switching circuit;
connecting a second zero-crossing circuit between the second power phase output and the ungrounded reference;
providing second control signals from the second zero-crossing circuit to the second power switching circuit;
connecting a third zero-crossing circuit between the first power phase output and the ungrounded reference; and
providing third control signals from the third zero-crossing circuit to the third power switching circuit.

15. The method of claim 11, further comprising:
providing, by a virtual load reference circuit connected in parallel with the ungrounded multi-phase load, the ungrounded reference for the plurality of zero-crossing circuits.

16. The method of claim 15, wherein the multiphase power source is a three-phase power source having first, second and third power phase outputs, and wherein the multi-phase load is a three-phase load having first second and third load phases.

17. The method of claim 16, wherein controlling, using the plurality of power switching circuits, the power provided to the ungrounded multiphase load comprises:
controlling, using a first power switching circuit, power from the first power phase output to the first load phase;
controlling, using a second power switching circuit, power from the second power phase output to the second load phase; and
controlling, using a third power switching circuit, power from the third power phase output to the third load phase.

18. The method of claim 17, wherein providing, by the virtual load reference circuit connected in parallel with the ungrounded multi-phase load, the ungrounded reference comprises:
connecting a first resistor between the first power switching circuit and an ungrounded reference node;
connecting a second resistor between the second power switching circuit and the ungrounded reference node; and
connecting a third resistor between the third power switching circuit and the ungrounded reference node.

19. The method of claim 18, wherein the first, second and third resistors all have a common resistance value.

20. The method of claim 18, wherein providing, by the plurality of zero-crossing circuits, the control signals to the plurality of power switching circuits comprises:

connecting a first zero-crossing circuit between the first power phase output and the ungrounded reference node;

connecting a second zero-crossing circuit between the second power phase output and the ungrounded reference node; and connecting a third zero-crossing circuit between the third power phase output and the ungrounded reference node.

\* \* \* \* \*